US012106757B1

(12) United States Patent
Chandran et al.

(10) Patent No.: US 12,106,757 B1
(45) Date of Patent: Oct. 1, 2024

(54) SYSTEM AND A METHOD FOR EXTENDING VOICE COMMANDS AND DETERMINING A USER'S LOCATION

(71) Applicant: Deepak R Chandran, Monmouth Junction, NJ (US)

(72) Inventors: Deepak R Chandran, Monmouth Junction, NJ (US); Michael R Ball, Willowgrove, PA (US)

(73) Assignee: Deepak R. Chandran, Monmouth Junction, NJ (US)

(*) Notice: Subject to any disclaimer, the term of this patent is extended or adjusted under 35 U.S.C. 154(b) by 0 days.

(21) Appl. No.: 18/352,837

(22) Filed: Jul. 14, 2023

(51) Int. Cl.
*G10L 15/22* (2006.01)
*H04W 4/02* (2018.01)
*H04W 4/90* (2018.01)

(52) U.S. Cl.
CPC .............. *G10L 15/22* (2013.01); *H04W 4/02* (2013.01); *H04W 4/90* (2018.02)

(58) Field of Classification Search
CPC ................................. G10L 15/22; H04W 4/02
See application file for complete search history.

(56) References Cited

U.S. PATENT DOCUMENTS

| 9,730,300 | B2 * | 8/2017 | Chow ..................... H05B 47/19 |
| 10,482,904 | B1 * | 11/2019 | Hardie .................... G10L 15/22 |
| 10,541,744 | B2 * | 1/2020 | Falkenstein, Jr. ..... H04W 88/08 |
| 10,616,723 | B1 * | 4/2020 | Layne ................. G01C 21/206 |
| 10,855,948 | B2 * | 12/2020 | Hoye ....................... H04N 5/77 |
| 11,006,077 | B1 * | 5/2021 | Truong ................. H04W 12/02 |
| 11,138,976 | B1 * | 10/2021 | Bailey ..................... G06F 3/167 |
| 11,200,901 | B2 * | 12/2021 | Torpy ..................... G10L 15/30 |
| 11,206,549 | B1 * | 12/2021 | Eyuboglu ........... H04J 11/0079 |
| 11,538,336 | B1 * | 12/2022 | Anvari .................. H04L 67/125 |
| 11,564,194 | B1 * | 1/2023 | DeCenzo ............... H04L 69/08 |
| 11,614,747 | B2 * | 3/2023 | Eoh ........................... B25J 9/16 701/27 |
| 2011/0208520 | A1 * | 8/2011 | Lee ........................ G10L 25/78 704/E15.039 |

(Continued)

FOREIGN PATENT DOCUMENTS

| CN | 107628405 A | * | 1/2018 | |
| DE | 102020215728 A1 | * | 6/2021 | ............. B60R 25/22 |

(Continued)

*Primary Examiner* — Daniel C Washburn
*Assistant Examiner* — Oluwadamilola M Ogunbiyi
(74) *Attorney, Agent, or Firm* — Vani Moodley, Esq.

(57) ABSTRACT

The present invention provides a system (100) for extending voice commands and determining a user's location. The system (100) includes a plurality of interconnected user devices (10*a*, 10*b*, 10*c*, 10*d*, 10*e*, 10*f*, 10*g*, 10*h*, 10*i*, 10*j*, . . . ) forming a meshed network (1000), to receive a voice command from a user (1) for extending the range of voice command detection. Further, the system (100) includes a base unit (20) connected to one of the user devices, which receives the voice command from the user device (10) closest to the base unit (20) and calculates ranging data. A master controller (30), connected to multiple base units (20*a*, 20*b*, 20*c*, 20*d*, . . . ), calculates the user's location based on ranging data, processes the voice command to determine the user's intent, and performs an action based on the determined intent and sends the user's location to a central server (40), to visualize the user's location on map.

17 Claims, 6 Drawing Sheets

(56) References Cited

U.S. PATENT DOCUMENTS

| | | | |
|---|---|---|---|
| 2013/0258923 A1* | 10/2013 | Chou | H04W 52/0206 370/311 |
| 2016/0006892 A1* | 1/2016 | Anderson | H04N 1/00204 358/1.15 |
| 2017/0289329 A1* | 10/2017 | Yim | H04W 88/02 |
| 2018/0061409 A1* | 3/2018 | Valentine | G10L 15/20 |
| 2018/0204575 A1* | 7/2018 | Huang | H04L 12/282 |
| 2018/0217224 A1* | 8/2018 | Jain | H04W 64/003 |
| 2019/0019504 A1* | 1/2019 | Hatambeiki | G10L 15/20 |
| 2019/0020493 A1* | 1/2019 | Arling | G10L 15/22 |
| 2019/0179029 A1* | 6/2019 | Pacala | G01S 17/87 |
| 2019/0341037 A1* | 11/2019 | Bromand | G06F 3/167 |
| 2020/0076621 A1* | 3/2020 | Lesso | G06F 21/32 |
| 2020/0211554 A1* | 7/2020 | White | G10L 15/1815 |
| 2020/0213632 A1* | 7/2020 | Goldberg | H04N 21/235 |
| 2020/0287590 A1* | 9/2020 | Torborg | H04B 1/7183 |
| 2021/0006971 A1* | 1/2021 | Austin | H04W 72/543 |
| 2021/0076349 A1* | 3/2021 | Ioffe | G01S 13/10 |
| 2021/0090578 A1* | 3/2021 | Trapp | H04L 63/102 |
| 2021/0280325 A1* | 9/2021 | Jepperson | G06F 40/10 |
| 2021/0368441 A1* | 11/2021 | Harte | H04W 52/0229 |
| 2021/0400434 A1* | 12/2021 | Bishop, Jr. | G01S 3/50 |
| 2022/0368163 A1* | 11/2022 | Paduvalli | H02J 50/20 |
| 2022/0400356 A1* | 12/2022 | An | H04W 4/70 |
| 2023/0092896 A1* | 3/2023 | Zuckerman | G05D 1/101 705/338 |
| 2023/0161356 A1* | 5/2023 | Eoh | G05D 1/0274 701/25 |
| 2023/0188488 A1* | 6/2023 | Maalouf | G10L 15/1822 709/206 |
| 2023/0232184 A1* | 7/2023 | Sidhu | H04W 4/33 455/456.3 |
| 2023/0297664 A1* | 9/2023 | Soryal | H04L 63/061 726/6 |
| 2023/0308899 A1* | 9/2023 | Thomas | H04W 24/08 370/252 |
| 2023/0345393 A1* | 10/2023 | Khalid | H04W 56/0015 |

FOREIGN PATENT DOCUMENTS

| | | | | |
|---|---|---|---|---|
| KR | 20060122055 A | * | 11/2006 | H04B 7/2643 |
| KR | 20090055144 A | * | 6/2009 | H04W 88/184 |
| WO | WO-2021209138 A1 | * | 10/2021 | G06F 16/683 |
| WO | WO-2022088964 A1 | * | 5/2022 | |
| WO | WO-2022132925 A1 | * | 6/2022 | |

* cited by examiner

SYSTEM AND A METHOD FOR EXTENDING VOICE COMMANDS AND DETERMINING A USER'S LOCATION

FIELD OF THE INVENTION

The present invention relates to a voice extension system to extend voice commands and to determine the user's location. More specifically, the present invention relates to a system, and method for extending voice commands and determining a user's location using specific techniques, processes, and equipment to enhance the reach of voice commands and identify the user's location.

BACKGROUND OF THE INVENTION

Generally, existing voice-based assistant systems use traditional wireless communication technologies that rely on a central device which is connected to multiple peripheral devices through point-to-point communication. This setup has limitations in range or coverage area which results in issues such as network congestion, interference, limited flexibility, communication problems, security concerns. As a result, the system is not able to recognize the voice commands from larger distances.

Furthermore, standalone or cloud-based voice assistant systems also have limitations, as they have a limited range and lack the ability to extend the coverage area. These systems rely on a single device, which may not be suitable for larger areas or environments with a lot of obstacles. Also, they do not provide the user's location, which delays the response time and hinders assistance in emergency situations.

In these existing systems, multiple devices in close proximity receive and respond to the same voice commands at the same time resulting in generation of multiple responses for a single voice command.

Additionally, the present system does not provide the user's location. And, the network's inability to accurately identify the source of the voice command makes it challenging for the system to quickly locate and assist the person in need. The limited range of the network also limits its ability to effectively respond to emergencies in certain areas.

Therefore, there is a requirement for a system for the extension of voice commands which overcomes few or all drawbacks of the existing systems.

OBJECTS OF THE INVENTION

An object of the present invention is to provide a system and a method for extending voice commands and determining a user's location.

Another object of the present invention is to provide a system and a method for extending voice commands which extends a range of detection to detect a voice command for further processing.

Still another object of the present invention is to provide a system and a method for extending voice commands and determining a user's location that quickly locates and facilitates emergency assistance to the person in need.

Yet another object of the present invention is to provide a system and a method for extending voice commands which enhances the efficiency of communication.

Yet another object of the present invention is to provide a system and a method for extending voice commands and determining a user's location which is a secure and reliable system for emergency communication.

SUMMARY OF THE INVENTION

According to the present invention, a system and a method for extending voice commands and determining a user's location is provided. The system includes a plurality of user devices, a plurality of base units, and a processing unit. The processing unit includes a master controller, and a central server.

A user device is provided to receive a voice command from a user. The plurality of user devices is wirelessly connected to each other to form a meshed network of interconnected user devices. The meshed network of user devices provides seamless and reliable transmission of voice commands and for extending the range of voice command detection. The meshed network utilizes various communication technologies for enabling efficient and reliable communication among the user devices and employs advanced algorithms. The advanced algorithms include, routing and forwarding algorithms for efficient data transmission, encryption algorithm for security which protects the privacy of the data by converting it into an unreadable form that cannot be intercepted or tampered with by unauthorized individuals, error correction algorithms for reliability, which ensures that data is transmitted accurately by detecting and correcting errors that occur during transmission, path finding algorithms for selecting an optimum route for data transmission, and Compression algorithms for reducing the data size of voice commands and optimizing network resources.

The user device transmits the voice command from one user device to another user device in the meshed network until the voice command reaches the user device which is nearest to the base unit. Upon receiving the voice command at the nearest user device, the nearest user device transmits the voice command to the base unit.

In another aspect of the present invention, each of the user device is adapted to function as a standalone secure user voice interface for both cloud-based and non-cloud-based external voice assistants over the meshed network. The user device can act as a network interface node when connected wired or wirelessly to an external device which is but not limited to a mobile phone or a tablet or a computer for configuring, provisioning, and commissioning of other existing user devices over the meshed network. A new user device is wired or wirelessly connected to the external device to configure it and add it to the meshed network.

Each of the user device includes a microphone array, an audio front-end (AFE) module, an application processor, a communication module, a vibration motor, a speaker, a camera, a Lidar/Radar sensor, and a power unit. The microphone array is provided to capture the voice command from the user. A captured audio is then filtered and amplified by the audio front-end (AFE) module to enhance accuracy and remove background noises from the voice command.

The audio front end (AFE) module of the user device improves the quality of audio signals using various Digital Signal Processing (DSP) algorithms such as a far field voice capture amplification technique which captures the voice commands from the user who is several meters away from the user device, an Acoustic Echo Cancellation (AEC) algorithm is used to remove acoustic echoes from the user's voice command, barge-in algorithm allows the system to listen and respond to a voice command even when the user device is playing back the audio, de-reverberation algorithm reduces the impact of room echoes, an adaptive beamforming technique tracks the user's speech from a desired direction while suppressing audio interference from other directions, a playback enhancement technique improves the quality of audio played through the speaker, and an automatic Gain Control (AGC) algorithm adjusts the gain of input audio signal to maintain a consistent audio level.

The voice command is processed by a voice processing engine of the user device application processor to verify the voice command using Automatic Speech Recognition (ASR) algorithms. Once the voice command is verified then the voice processing engine authenticates the user using voice biometrics algorithms. Wherein, the user requires user registration into the system by providing the user ID and speaking specific phrases or words into the user device to prevent unauthorised usage of the system.

Further, the communication module of user device is provided to transmit and receive data between interconnected user devices of the meshed network. Also, the communication module is provided to transmit and receive data between the user device and the base unit. The data received and transmitted by the communication module is but not limited to the voice command, a user device ID, and a user ID.

The vibration motor provides feedback to the user, a speaker provides audio feedback, and a display unit confirms a receipt of the voice command and provides visual feedback to the user. Additionally, the panic button is provided to make an emergency call in case of an urgent situation, the camera captures the user's movement, and the Lidar/Radar sensor detects human presence. The power unit is provided to supply power to all the components of the user device.

In another aspect of the present invention, the user device is adapted to function as a voice assistant which receives the voice command from the user through the microphone array, processes the voice command and then gives a voice response as feedback through the speaker.

In one more aspect of the present invention, the user device is a wearable device having a GPS module to track the location of the user.

The base unit is connected to the meshed network through one of the user devices of the meshed network, more particularly the nearest user device to receive the voice command from the user device. The base unit is having a signal processor to calculate a ranging data, and a communication unit to transmit and receive data between the user device and the master controller. The base unit is having a power supply to supply power to all the components of the base unit. A plurality of base units are adapted to receive the voice command from the user device which is nearest to the base unit and calculate the ranging data for determining the user's location The processing unit is connected to the plurality of base units to receive the ranging data, user ID, user device ID and the voice command from the base unit. More specifically, the master controller of the processing unit receives the ranging data, user ID, user device ID and the voice command from the base unit. A processing module of the master controller processes the voice commands and the processing module is having a location engine to calculate the location of the user based on the ranging data received from the base unit. Further, the master controller is having a communication component for sending and receiving data between the base unit and the central server. Further, the master controller is having a memory unit to store data such as the voice command, the user device ID, the user ID, the ranging data, the user's location or like.

The processing module of the master controller has a speech-to-action model to process the voice command to determine the intent of the user and perform the corresponding action based on the determined intent and communicate the user ID, incident description, and user location details to the system based on the specific context and purpose of the application. The speech-to-action model processes the voice command only once, and ignores subsequent duplicate commands from the same user to avoid multiple responses.

Further, the processing unit is having the central server which is connected to the master controller to manage and configure the system.

In the present aspect of the invention, the central server visualizes the location of the user, tracks the plurality of user devices, and shows the real-time location of the user device.

Further, a method for the extension of user voice commands and determining a user's location is explained in conjunction with the system for the brevity of the invention.

First, the user device by using the microphone array receives the voice command from the user.

The audio front-end (AFE) module of the user device filters and amplifies the voice command to enhance accuracy and remove background noises from the voice command.

The voice processing engine of the application processor verifies the voice command using Automatic Speech Recognition (ASR) algorithms to check whether the voice command is valid or not. If the voice command is valid, then, the voice processing engine verifies the user by using voice biometrics algorithms to check whether the user is registered in the system or not.

Upon verifying the user, if the user is an authorised user, the voice command, a user device ID and a user ID are transmitted to interconnected devices of the meshed network.

The base unit receives the voice command, the user device ID and the user ID from the user device which is nearest to the base unit. Further, the base unit calculates the ranging data with the user device that received the voice command from the user for determining the user's location through the meshed network (100).

The base unit transmits the voice command, the user device ID, the user ID, and the ranging data to the master controller. Further, the location engine of the master controller calculates the user's location based on the ranging data received from the base unit.

The speech-to-action model of the processing module processes the voice command to determine the intent of the user and perform the corresponding action based on the determined intent and communicate the user information, incident description, and user location details to the appropriate party or system based on the specific context and purpose of the application. Also, provides feedback to the user regarding the status of the action taken.

The central server of the system is connected to the master controller and receives the user's location from the master controller to visualise the user's location.

The system is particularly implemented in larger areas or premises or multi-storied homes or buildings enabling users to summon emergency help with voice recognition commands from a larger distance or area without need to speak loudly. Further, the system is capable of locating the user's location and processing the voice command to determine the intent of the user and perform the corresponding action based on the determined intent to provide a quick assistance to the user in an emergency based on the user's location wherein the user's location is crucial in emergency situations, enabling first responders, such as emergency services to rapidly locate and assist the user.

BRIEF DESCRIPTION OF DRAWINGS

The advantages and features of the present invention will be understood better with reference to the following detailed description and claims taken in conjunction with the accompanying drawings, wherein like elements are identified with like symbols, and in which:

DETAILED DESCRIPTION OF THE INVENTION

An embodiment of this invention, illustrating its features, will now be described in detail. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

The disclosed embodiments are merely exemplary of the invention, which may be embodied in various forms.

The present invention provides a system and a method for extending voice commands and determining a user's location. The system is provided to extend a range of voice command detection with seamless and reliable transmission of voice commands. The system locates a user's location to provide quick assistance to a person in an emergency. The user devices are receiving voice commands from the user. Also, the devices work as a repeater, a locator, and an interface node.

Figure 1:
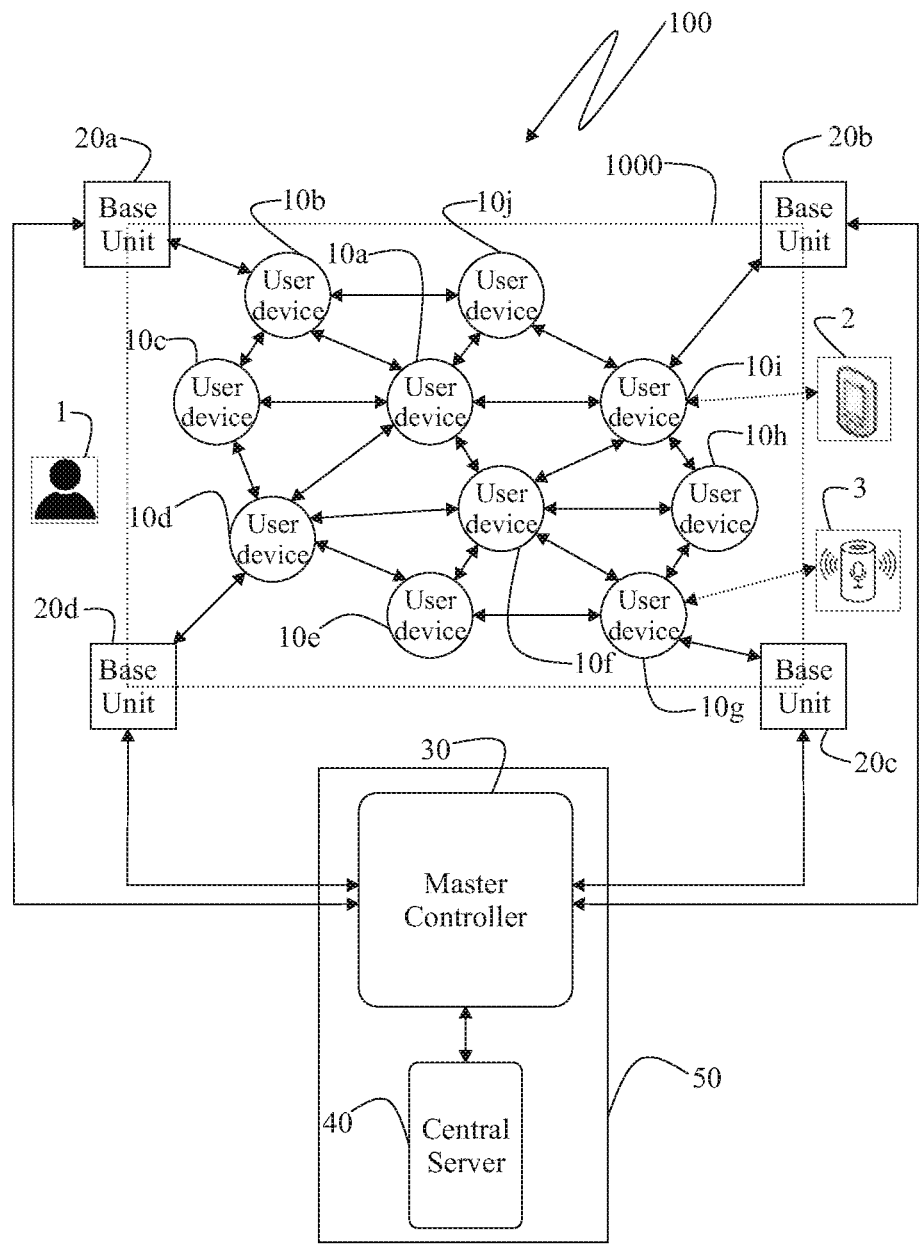
FIG. 1 shows a schematic view of a system for extending user voice commands and determining a user's location.
Figure 2:
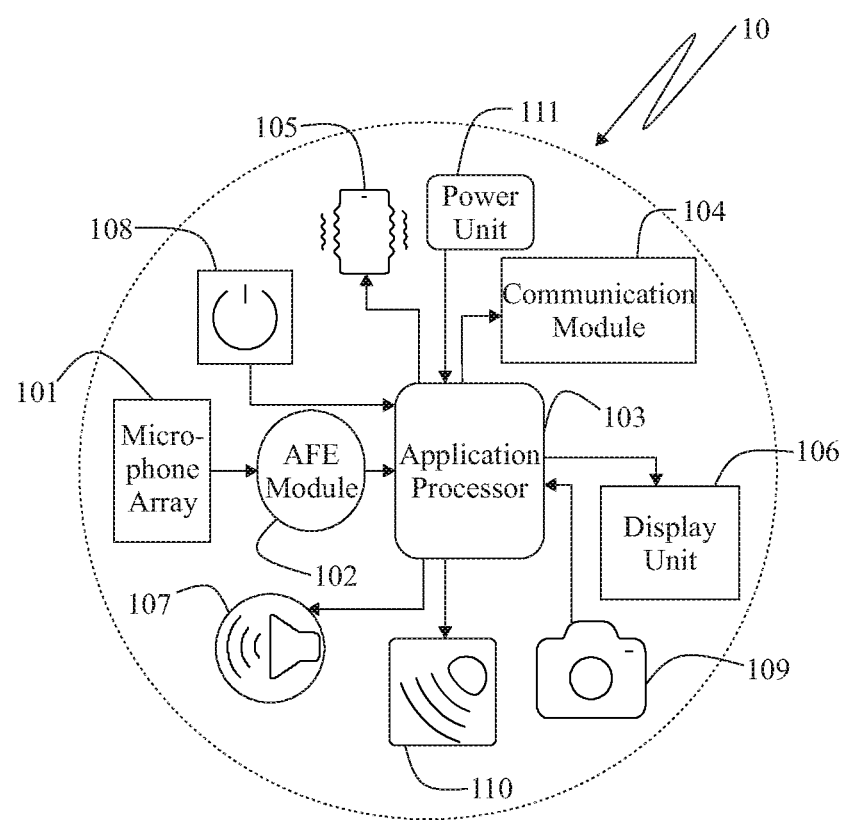
FIG. 2 shows a schematic view of a user device in accordance with the system for extending user voice commands and determining a user's location shown in FIG. 1.
Figure 3:
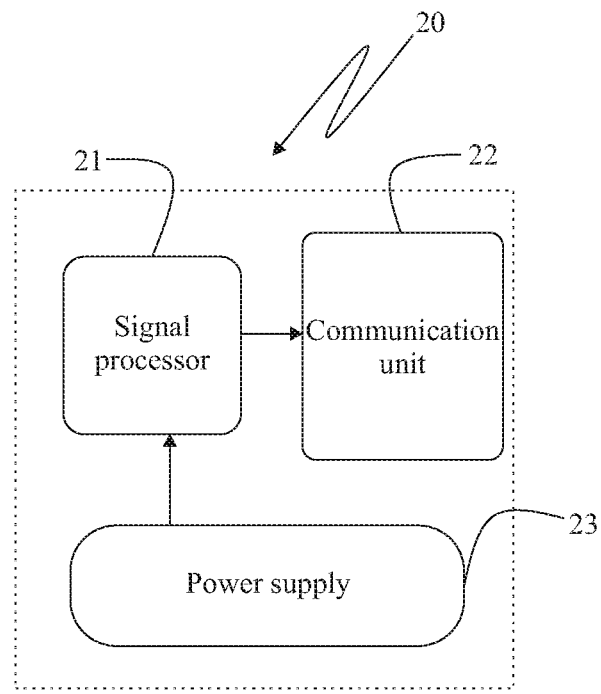
FIG. 3 shows a schematic view of a base unit in accordance with the system for extending user voice commands and determining a user's location shown in FIG. 1.
Figure 4:
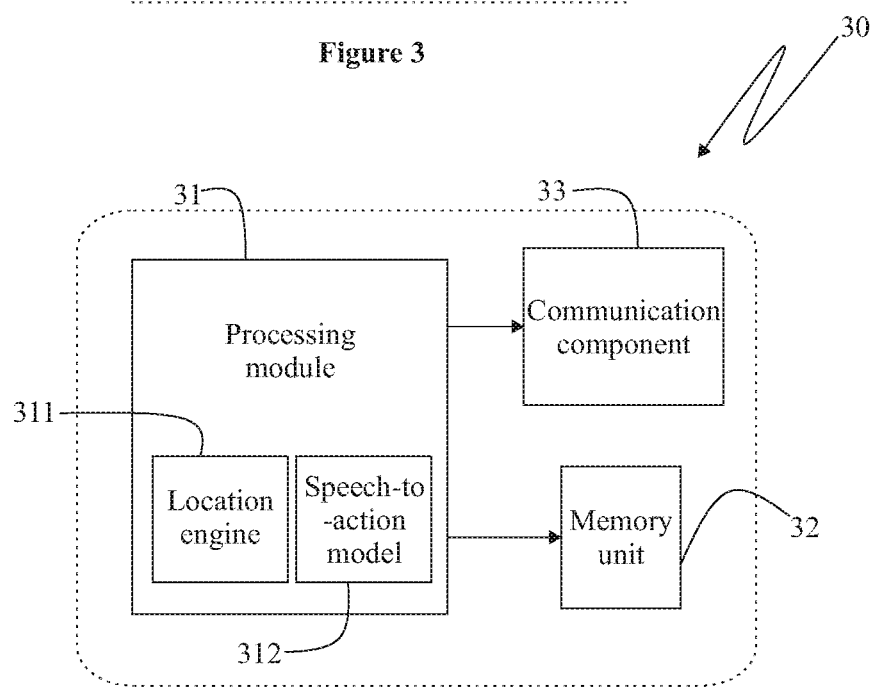
FIG. 4 shows a schematic view of a master controller in accordance with the system for extending user voice commands shown in FIG. 1.
Figure 5:
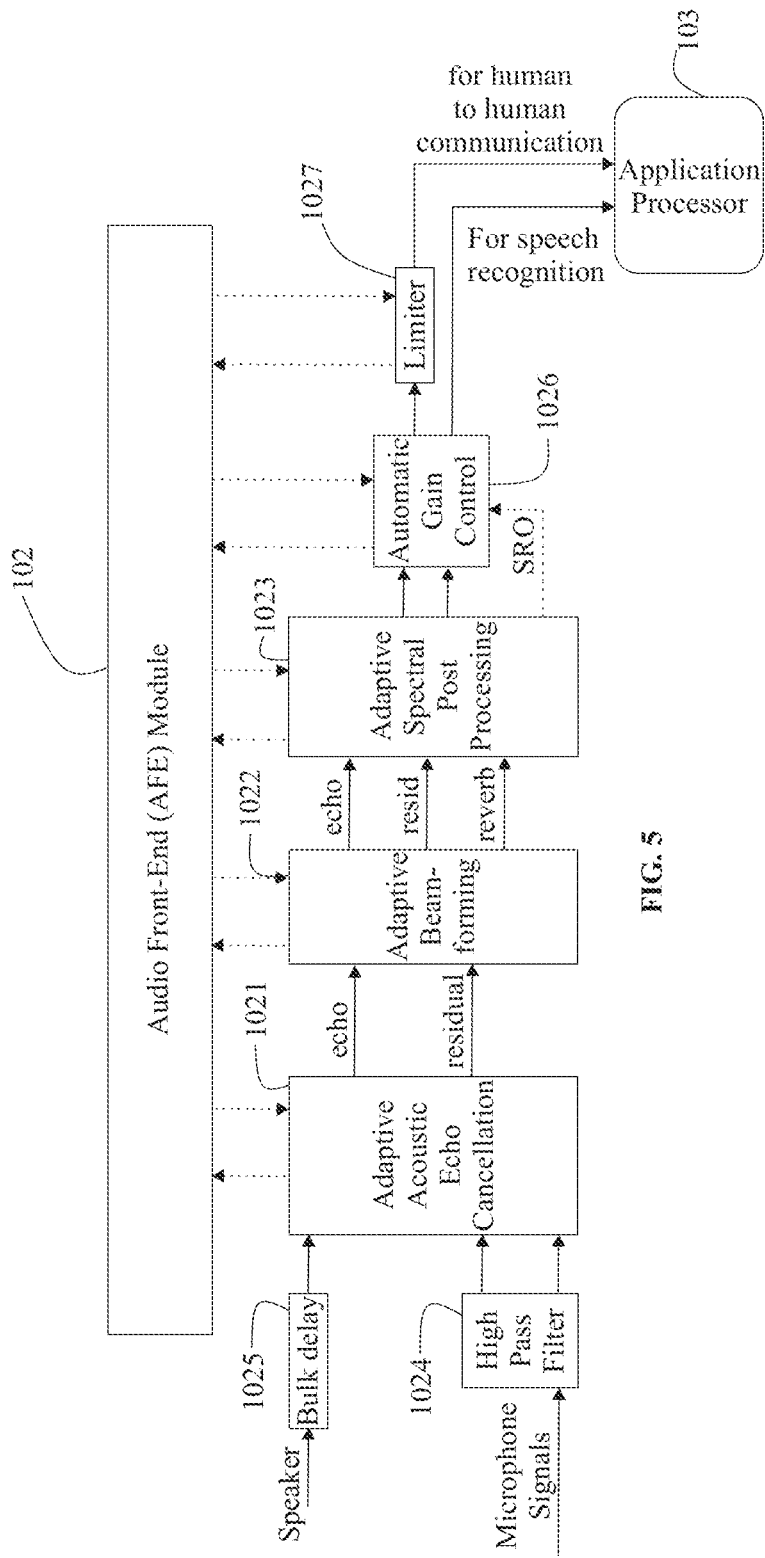
FIG. 5 shows a block diagram of an audio front-end (AFE) module (102) in accordance with the user device shown in FIG. 2.
Figure 6A:
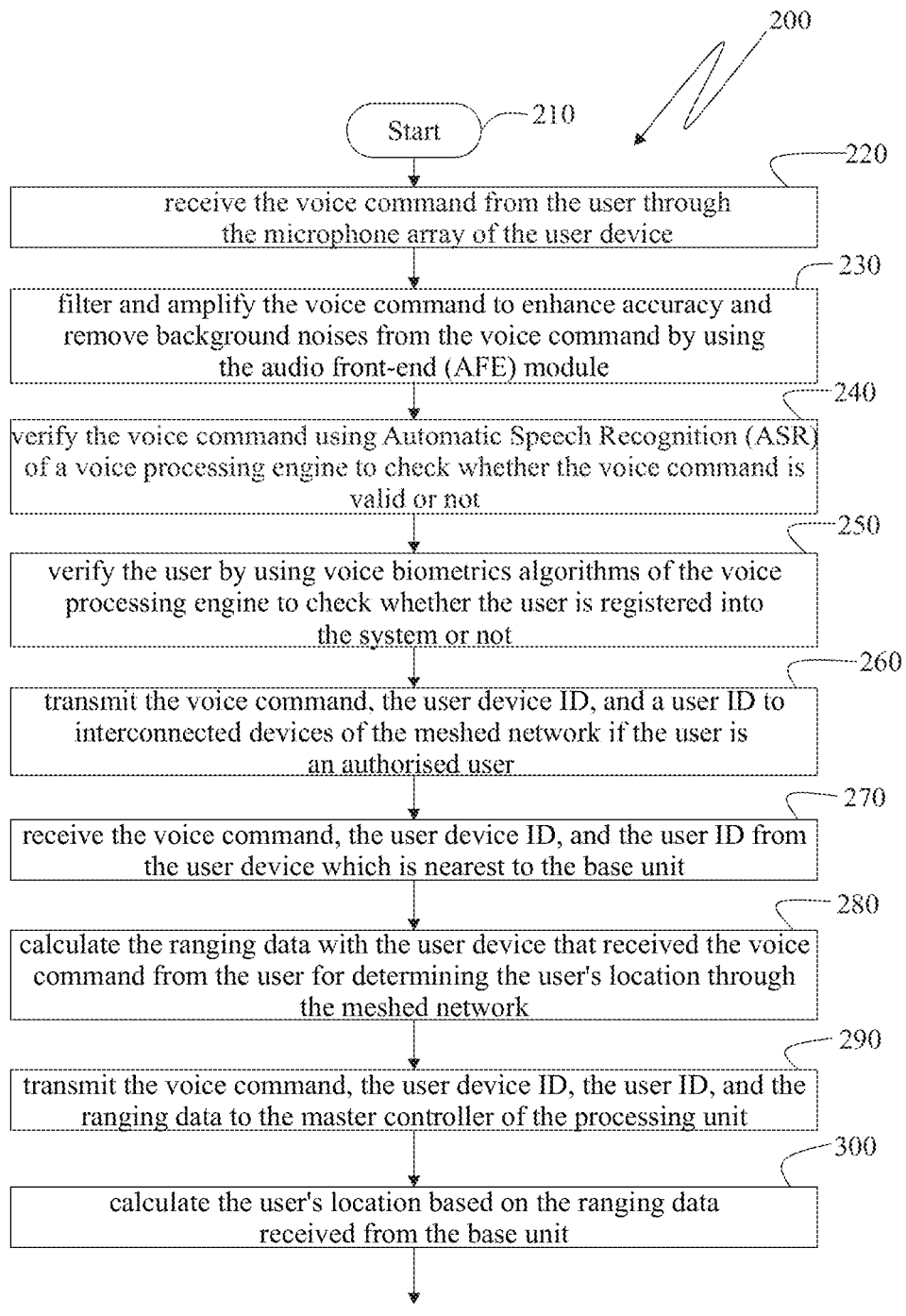
FIG. 6 shows a flowchart of a method for extending user voice commands and determining a user's location in accordance with the present invention.
Figure 6B:
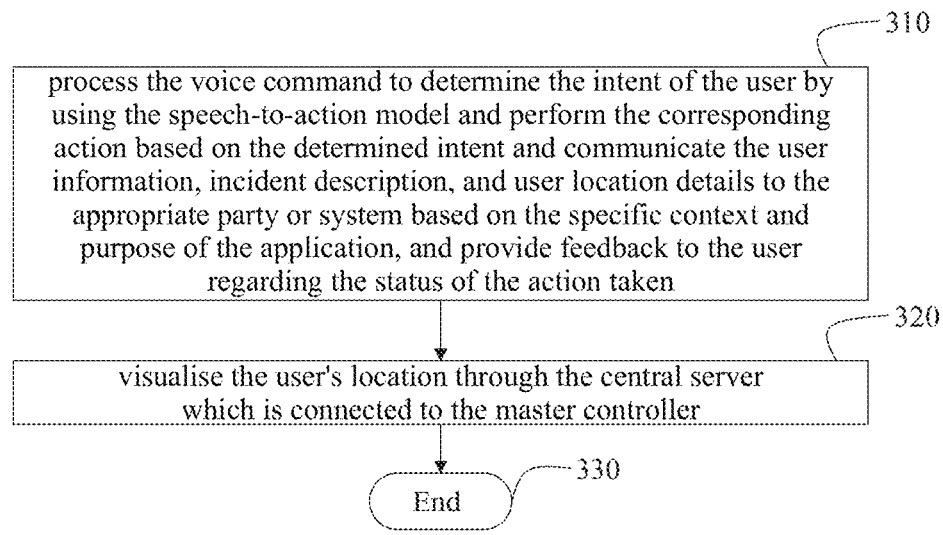

Referring now to FIG. 1, a system (100) for extending voice commands and determining a user's location in accordance with the present invention is illustrated. The system (100) includes a plurality of user devices (10a, 10b, 10c, 10d, 10e, 10f, 10g, 10g, 10h, 10i, 10j . . . ). a meshed network (1000), a plurality of base units (20a, 20b, 20c, 20d), and a processing unit (50). The processing unit (50) includes a master controller (30) and a central server (40).

The plurality of user devices (10a, 10b, 10c, 10d, 10e, 10f, 10g, 10h, 10i, 10j . . . ) are connected with each other to form the meshed network (1000) of interconnected devices for seamless and reliable transmission of voice commands and for extending the range of voice command detection. The meshed network (1000) includes the plurality of user devices (10a, 10b, 10c, 10d, 10e, 10f, 10g, 10h, 10i, 10j) interconnected with each other by communication technologies like but not limited to Bluetooth, Ultra-Wide Band (UWB), Wi-Fi, Zigbee, Thread, and Z-Wave mesh networks. Hereinafter, the plurality of user devices (10a, 10b, 10c, 10d, 10e, 10f, 10g, 10g, 10h, 10i, 10j . . . ) is collectively referred to as "the user device (10)" for the convenience of explanation. The user device (10) is adapted to receive the voice command from a user (1). Also, the user device (10) works as a repeater, a location tag, and an interface node. When a data is transferred from one of the user devices (10a/10b/10c/10d/10e/10f/10g/10g/10h/10i/10j) to another user device (10a/10b/10c/10d/10e/10f/10g/10g/10h/10i/10j), each of the user device (10a/10b/10c/10d/10e/10f/10g/10g/10h/10i/10j) works as the repeater to transmit and receive data from the user device (10) to a nearby user device (10) of the meshed network (1000).

For example (referring to FIG. 1), if the user device (10a) receives the data in the form of the voice command from the user (1), the user device (10a) transfers the voice command to the nearby user device that is the user device (10b) or user device (10c) or user device (10d) or user device (10f) or user device (10i) or user device (10j). If the user device (10a) transmits the data to the user device (10f) and then the user device (10f) transfers the data to the user device (10g) to reach the base unit (20c), the user device (10f) and the user device (10g) act as the repeater to receive and transmit the data simultaneously to ensure the data reaches the base unit (20c). In this case, the user device (10f) and the user device (10g) are repeaters to receive and transmit the data from the user device (10c) to the base unit (20c).

The Data transferred between interconnected user devices of the meshed network (1000) is but not limited to a voice command, a user device ID, a ranging data, and a user ID.

The user device (10) works as the location tag when the plurality of base units (20a, 20b, 20c, 20d, . . . ) receives ranging data from the user device (10) using various ranging techniques. The plurality of base units (20a, 20b, 20c, 20d, . . . ) are connected to the meshed network (1000) through one of the user devices (10). Each of the base unit (20a, 20b, 20c, 20d, . . . ) is adapted to receive the voice command from the user device (10). Hereinafter, the plurality of base units (20a, 20b, 20c, 20d, . . . ) are collectively referred to as "the base unit (20)" for the convenience of explanation. Various ranging techniques are described later in the specification.

Further, a new user device (not shown) is adapted to connect with an external device (2) which is but not limited to a mobile phone, a tablet, or a laptop. To add the new user device to the meshed network (1000), the new user device is wired or wirelessly connected to the external device (2). After connecting the new user device with the external device (2), the user (1) can configure the new user device and add the new user device to the meshed network (1000) by using the external device (2). The user device (10) can also act as the network interface node when connected with the external device (2) for configuring, provisioning, and commissioning of other existing user devices over the mesh network (1000). In such case, the user (1) can adjust communication parameters, tune voice processing algorithms, and manage security settings and user permissions.

Referring now to FIGS. 1, 2, 3, 4 and 5, the user device (10) includes a microphone array (101), an audio front-end (AFE) module (102), an application processor (103), a communication module (104), a vibration motor (105), a display unit (106), a speaker (107), a panic button (108), a camera (109), a Lidar/Radar sensor (110), and a power unit (111) to supply power to all components of the user device (10). The microphone array (101) of the user device (10) captures the voice command of the user (1). The microphone array (101) is a collection of multiple microphones positioned in a specific arrangement or geometry such as but not limited to a circular, linear, diamond, triangular, square, or Y shape array to capture the voice command from all possible directions. The user device (10) is adapted to receive the voice command from a registered user only. The user (1) can be registered into the system (100) anytime by providing a user ID and by speaking specific phrases or words into the user device (10).

The audio front-end (AFE) module (102) which is arranged after the microphone array (101) is introduced after receiving the voice command of the user (1) through the microphone array (101). The audio front-end (AFE) module (102) filters and amplifies the voice command to enhance accuracy and remove background noises from the voice command. The audio front-end (AFE) module (102) employs a combination of advanced audio processing techniques comprising various algorithms such as Far Field Voice Capture, Acoustic Echo Cancellation (AEC), Barge-in, De-reverberation, Adaptive Beamforming, Playback Enhancement, Automatic Gain Control, and noise cancellation techniques to enhance the accuracy and reliability of voice command recognition.

The audio front-end (AFE) module (102) (hereinafter referred to as "the AFE" (102)) is an audio processing pipeline comprised of three main stages (refer to FIG. 5): Adaptive Acoustic Echo Cancellation (1021) (hereinafter referred to as "adaptive AEC (1021)"), Adaptive beamforming (1022), and Adaptive Spectral Post Processing (1023). The microphone signals and a speaker signal are inputs to the audio processing pipeline. Two output signals are produced that contain the enhanced speech of the near-end user: one optimized for human-to-human communication and the other optimized for speech recognition engine. To improve speech intelligibility, a high-pass filter (1024) is applied to the microphone signals before they pass through the adaptive AEC (1021). The adaptive AEC (1021) estimates the echo signals in the microphone signals and subtracts them. To improve the efficiency of the adaptive AEC (1021), the far-end signal is delayed by a bulk delay (1025).

The adaptive beamforming (1022) filters residual signals received from the adaptive AEC (1021) and adapts its coefficients when it detects near-end speech. The adaptive beamforming (1022) outputs the enhanced signal via its primary output, provides reverberation reference signals, and provides a mono version of the echo signal (echo), which are all passed to the adaptive spectral post processing (1023). For the communication output, the adaptive spectral post processing applies noise suppression to the primary output of the adaptive beamforming (1022). The adaptive spectral post processing (1023) then uses estimates of any remaining residual echo, stationary noise, and reverberation to perform spectral subtraction. An Automatic Gain Control (AGC) (1026) and Limiter (1027) are applied to ensure that the output signal has the desired signal strength. A speech recognition output (SRO) is then passed to the Automatic Gain Control (AGC) (1026) to ensure the output signal has the desired signal strength.

The AFE module (102) includes Far-field voice capture, which is an amplification technique used to capture voice commands from the user (1) who is several meters away from the user device (10). This technique enables the user (1) to interact with the user device (10) from a comfortable distance without the need to speak loudly or move closer to the microphone array (101).

The AFE module (102) uses the adaptive AEC (1021) which is a signal processing algorithm used to remove acoustic echoes from the voice command, which can improve the quality and clarity of the voice command. Acoustic echo occurs when a speaker plays an audio signal and the same device's microphone captures that audio signal from the speaker. The adaptive AEC (1021) works by estimating the echo using a filter that takes the delayed speaker signal as input and subtracting that estimate from the microphone signals to remove the echo. The High Pass filter (1024) coefficients are updated in real-time using the residual signal to improve the accuracy of the AEC filter. The Adaptive AEC algorithm uses a Frequency Domain Adaptive Filter (FDAF) to generate the echo estimates and filter coefficients.

The AFE module (102) also includes Barge-in and De-reverberation algorithms. Barge-in allows the system (100) to listen and respond to the voice command even when the user device (10) is playing back the audio. De-reverberation is a technique that improves the quality of audio signals by reducing the impact of room echoes. In large and reverberant spaces, such as conference rooms, echoes and reverberations can significantly degrade the quality and intelligibility of speech. The AFE module's (102) de-reverberation feature applies advanced signal processing techniques to identify and reduce the effects of reverberation in the audio signal.

The AFE module (102) further uses the adaptive beamforming (1022), which is a signal processing technique used in the microphone array (101) to track the voice command from a desired direction while suppressing audio interference from other directions. The adaptive algorithm is used to select the best microphone for tracking the voice command and suppressing audio from other directions improving the overall performance of the system (100). It analyses the signals from each microphone and generates a beam, which is a spatial filter that enhances signals from a particular direction while suppressing signals from other directions. It focuses on the near-end source and suppresses interference from other directions. An adaptive frequency domain Filtered Sum Beamformer (FSB) is used, which takes reflections of the desired source into account. The adaptive beamforming (1022) takes the adaptive AEC (1021) residual signals as inputs and outputs a primary enhanced mono time-domain residual signal (resid) with an improved Clarity Index (CI).

The adaptive beamforming (1022) can be configured as a circular or linear array. In a circular array, it adapts to near-end sources based on Voice Activity Detection (VAD) and maximizes power output. A Path Change Detector (FSB PCD) triggers when a source is detected in a significantly different location, and a slave beamforming filter is used to construct the mono echo output signal (echo). In a linear array, the adaptive beamforming adapts to near-end sources based on Audio Source Localization (ASL) and uses the FSB PCD to switch to a faster tracking mode. The slave beamforming filter is used to construct the mono echo output signal in both configurations.

The AFE module (102) further includes a playback enhancement technique that improves the quality of audio played through the speaker (107) of the user device (10). This can be achieved through various methods such as equalization, and dynamic range compression that can improve the clarity and overall sound quality of the audio.

The goal of playback enhancement is to deliver high-quality audio playback that is clear, natural-sounding, and easy to understand, thereby enhancing the user's listening experience.

The AFE module (102) also includes an Automatic Gain Control (1026) (hereinafter referred to as "the AGC (1026)") technique, where the AGC (1026) circuit continuously monitors the level of the incoming audio signal and adjusts the gain in real-time to keep the output level within a set range. The AGC (1026) adjusts the gain of input audio signal to maintain a consistent audio level. This can be implemented using hardware or software algorithms. The benefits of using the AGC (1026) include improved audio quality, reduced distortion, prevention of clipping or saturation of the audio signal, and improved speech intelligibility by maintaining a consistent level and reducing background noise. To achieve this, the AGC (1026) amplifies or attenuates its input signal such that the average power of the output signal has a certain desired level. The AGC (1026) adjusts its gain based on the power of the input signal during moments when voiced speech is detected. By doing so, it can prevent sudden changes in volume that can be distracting or difficult to hear and ensure that the voice command is clearly heard by the system (100).

The AFE module (102) further includes a first-level noise cancellation technique to remove unwanted noise from an audio signal at an early stage. It is typically achieved through digital signal processing techniques such as filtering, gain adjustment, and noise reduction algorithms. The goal of the first-level noise cancellation is to reduce the impact of environmental noise on the audio signal, thereby improving its overall quality and making it easier to understand.

The AFE module (102) also includes a 3D de-reverberation algorithm, which cancels out the reverberation echo produced from reflective surfaces in a closed environment. The 3D de-reverberation algorithm is a mathematical technique for reducing the effects of reverberation echo in a speech or audio signal. Reverberation echo is created when sound waves bounce off reflective surfaces, causing multiple versions of the same sound to arrive at the microphone at different times. This can interfere with speech recognition and voice commands, making it difficult to accurately detect and interpret the speech signal. The 3D de-reverberation algorithm aims to remove this interference, improving the accuracy and reliability of the voice command. The 3D de-reverberation algorithm estimates the impulse response of the room, which characterizes the effects of the reflective surfaces on the sound signal.

Time-domain methods and frequency-domain methods are two different approaches to estimating the impulse response of a room in the context of 3D de-reverberation where time-domain methods involve measuring the impulse response of the room by sending a short test signal, such as a "chirp" or a "click," and observing the response of the system (100) over time. This information can then be used to model the reverberation effects of the room and suppress the echo in the audio signal. Frequency-domain methods, on the other hand, estimate the impulse response of the room by analysing the frequency content of the audio signal. This can be done using techniques such as fast Fourier transform (FFT) or frequency-domain maximum likelihood (FDML).

The voice command is then transferred to the application processor (103) from the AFE module (102). The application processor (103) is having a noise-cancellation Deep Neural Network (DNN) model and a voice processing engine.

The Artificial Intelligence and Machine learning (AI/ML)-based noise-cancellation DNN model extracts human speech from a wide range of common noise types, including stationary noises such as fans, AC, and kitchen blenders, non-stationary noises such as highways, trains, and wind noise, and highly dynamic noises such as traffic horns, baby cries, police sirens, and keyboard clicks. This can result in improved voice signal clarity, making it easier for reliable and accurate voice command recognition even in noisy conditions.

The voice processing engine uses Automatic Speech Recognition (ASR) and voice biometrics algorithm to ensure that the voice command is valid and the user (1) is a registered user. Automatic Speech Recognition (ASR) is a technology that enables the user device (10) to recognize and transcribe human speech into text. ASR uses a combination of signal processing techniques, statistical modelling, and machine learning algorithms to analyse a spoken voice command and match this voice command against a predefined vocabulary or set of commands. ASR can be trained to recognize different languages, accents, and dialects, making ASR useful for multilingual applications. Additionally, Automatic Speech Recognition (ASR) uses Natural Language Processing (NLP) technique to extract valuable information or intent from the user's speech that enables users with unlimited and freely spoken voice commands. Voice biometrics algorithm is a technology that uses unique characteristics of an individual's voice, such as tone, pitch, and rhythm, to identify and authenticate the speaker.

During the user registration or enrolment process, the user (1) is typically asked to provide a user ID or username and then asked to speak a set of phrases or words, ensuring consistency, and reducing environmental influences on the quality of voice. The user device (10) records and captures the voice signatures from the user voice samples to create a unique voice print or template, which is then associated with the user ID and stored securely in the user device (10). This template is used as a reference for future authentication attempts. Further, the user device (10) transmits the template along with the user ID to the master controller (30) through the mesh network (1000). The master controller (30) then sends this template along with the user ID to all other user devices for authentication purposes.

The user ID refers to a unique identifier that is assigned to a specific user's voiceprint to enable secure authentication and identification based on the unique characteristics of an individual's voice.

When the user (1) tells the voice command, the user device (10) checks spoken voice commands to match them against a predefined vocabulary or set of commands to check for a valid command. If the command is valid then the user device (10) uses advanced signal processing and machine learning algorithms to extract important features from the voice sample, such as pitch, frequency, and formants. The user device (10) then compares the extracted features to the stored reference voiceprints, calculating a similarity score that reflects the degree of correspondence between the two samples. To distinguish between genuine and imposter attempts, a threshold value is set. The user (1) is granted access if the similarity score is above the threshold and denies access if the score is lower.

The threshold values must be carefully tuned to minimize both false acceptances and false rejections. The enrolment process may involve multiple factors of authentication. This can prevent spoofing or other forms of fraud.

The user device ID refers to a unique identifier assigned to a specific user device. It serves to distinguish one device from another and allows for the identification and tracking of individual devices within the system (100) or the meshed network (1000). The user device ID plays a crucial role in identifying the user device (10) responsible for receiving the voice command and initiating the location calculation process with that particular user device, using various ranging techniques.

When the user (1) gives the voice command, the voice processing engine of the user device (10) verifies the voice command by analysing the spoken voice command to match with the predefined vocabulary or set of commands to check for valid commands If the voice command is valid, the voice processing engine captures the voice signature and compares it with the template of the registered user stored in the user device (10).

After verification of the user (1), the user device (10) transmits data to the nearby user device (10). For example. (Referring to FIG. 1), If the user device (10a) receives the voice command from the user (1) and verifies the user (1), the user device (10a) transfers the voice command, the user device ID, and a user ID to the nearby user device that is the user device (10b) or user device (10c) or user device (10d) or user device (10f) or user device (10i) or user device (10j).

The communication module (104) of the user device (10) includes a communication protocol stack to transmit data between interconnected devices of the meshed network (1000). Data transferred between interconnected devices of the meshed network (1000) is but not limited to the voice command, the user device ID, the ranging data, and the user ID.

The vibration motor (105) of the user device (10) provides feedback to the user (1) to give physical confirmation of the voice command made by the user (1), and the corresponding action is taken. Also, the display unit (106) is provided to give visual feedback such as confirming the receipt of the received voice command or indicating a successful or unsuccessful operation of the voice command received by the user device (10). The display is also used to show a status of the user device (10) or a status of the system (100) or a status of the voice command. Further, the speaker (107) is arranged inside the user device (10) to provide audio feedback to the user (1).

Further, the panic button (108) is used as a manual trigger for making an emergency call in case of an urgent situation. The user (1) can press the panic button (108) to immediately send an emergency signal and alert the authorities or emergency services.

Furthermore, the camera (109) is provided to capture user's movement. The camera (109) is provided with a direction of voice arrival (DOVA) algorithm to provide a more complete picture of the user's location and movements based on the direction of user's (1) voice command. The direction of voice arrival (DOVA) algorithm tracks the direction of the voice command in 360-degree azimuth angles and ±90-degree elevation angles. The camera (109) rotates based on the direction of the voice command and captures both images and video of a person in distress and surroundings, which is then transmitted to authorities for prompt action.

In another embodiment of the present invention, the camera (109) is used to enable hard-of-hearing or speech-impaired users to communicate using American Sign Language or its equivalent. For visually impaired users, the user device (10) uses speech or facial recognition to recognize the user (1) and provide appropriate feedback.

The Lidar/Radar sensor (110) detects the presence of humans without the need for cameras. The Lidar/Radar sensor (110) helps to detect the user (1) in low light scenarios or nights.

The power unit (111) of the user device (10) is a battery. The battery allows independent operation of the user device (10) without a wired connection to other power sources. The battery is charged through a USB connection or wireless charging. The battery as the power unit (111) allows the user device (10) to be portable and flexible in terms of where it can be used. In another embodiment of the present invention, the power unit (111) is connected to the wired power source to provide a more stable power source which is more efficient in the stationary or permanent installation of the user device (10).

The user device (10) is always in voice listening mode, and ready to receive the voice command from the user (1). When the user (1) gives the voice command, the user device (10) receives the voice command through the microphone array (101) and sends the voice command to the audio front-end (AFE) module (102), which improves the quality of the voice command through noise reduction, filtering, and amplification techniques.

Further, the user device (10) verifies the voice command using Automatic Speech Recognition (ASR) algorithms. If the voice command is valid then the user device (10) verifies the user (1) using voice biometrics algorithms. If the user (1) is an authorised user, the voice command along with the user device ID, and the user ID is transmitted to interconnected devices of the meshed network (1000). Specifically, the user device (10) sends the voice command, the user device ID, and the user ID to the nearby user device (10). For example. (Referring to FIG. 1), If the user device (10a) receives the voice command from the user (1), the user device (10a) transfers the voice command, the user device ID, and the user ID to the nearby user device that is the user device (10b) or user device (10c) or user device (10d) or user device (10f) or user device (10i) or user device (10j).

The user device (10) acts as the repeater and transmits data between interconnected devices of the meshed network (1000) to extend the range of the voice command detection.

In the present embodiment of the invention, the voice command is a specific spoken phrase or word that the system (100) recognizes to trigger a specific action or response. The voice command is primarily used to summon emergency help (E.g.: "Call emergency", "Help"). These commands are customizable and tailored to meet the specific needs and requirements of the user (1). The voice command typically consists of a wake word followed by a trigger command phrase, such as "Hey my device, Call 911". In this example, "Hey my device" is the wake word and "Call 911" is the trigger command phrase. In another embodiment of the present invention, the voice command includes a duress code that the user (1) uses in situations where the user (1) is in danger and unable to speak freely or safely. The duress code is a special type of voice command that signals to the system (100) that the user (1) is in danger or in an emergency and needs immediate help. The duress code is typically a pre-defined distress phrase that is different from other voice commands and is recognized by the system (100) as a signal for immediate assistance (E.g.: "Code Red", "May day").

During the registration of the user (1), the user (1) can set any desired custom wake words, trigger command phrases, and duress codes, and choose the predetermined speech-to-action or response measures for each of the trigger command phrases and duress codes. In another embodiment of the present invention, the system (100) allows the user (1) to pre-define a list of emergency contacts to be notified in the event of an emergency via text message, phone call, or other means of communication. In one more embodiment of the present invention, the user device (10) is configured to recognize the voice command in multiple languages for added accessibility and inclusivity.

The user device (10) works as a receiver and a transmitter, allowing for multiple paths for data to travel in the meshed network (1000). This increases the reliability and reach of the system (100). Additionally, the meshed network (1000) is a self-healing and self-organizing network. If one user device (10) fails, the meshed network (1000) automatically reroutes data to another nearby user device (10) to maintain connectivity. A mesh algorithm manages and optimizes the routing of data through the meshed network (1000). The meshed algorithm determines the best path for data to travel through the meshed network (1000) considering factors such as network congestion, signal strength, and available bandwidth.

The voice data is extended in the meshed network (1000) using routing algorithms optimized for voice communication, which helps to ensure that the voice command is transmitted efficiently and effectively. Routing algorithms are but not limited to Ad-hoc On-demand Distance Vector (AODV) and Optimized Link State Routing (OLSR). Additionally, routing algorithms like Destination-Sequenced Distance-Vector (DSDV) are used to maintain consistent routing tables in the network.

The meshed algorithm determines the best path for the voice command to travel through the meshed network (1000). The user device (10) receives the voice command and then transmits the voice command and the user ID to the nearby user device of the meshed network (1000). The nearby user device then transmits the voice command, the user device ID, and the user ID to the next nearby user device. Interconnected devices of the meshed network (1000) transmit data to the nearby user device until data reaches the base unit (20).

If a base unit of the plurality of base units (20) is not reachable, the meshed algorithm re-routes the path to find the next nearest user device, and the voice command is passed on to that nearest user device and ensures that data reaches to one of the base units of the plurality of base units (20).

The system (100) also employs advanced algorithms for optimum path finding and compression to enhance the overall performance of the meshed network (1000). Pathfinding algorithms help to determine the most efficient and reliable route for transmitting the voice command from the user device (10) to the base unit (20). This process ensures that the voice command reaches the base unit (20) without errors, minimizing latency and maximizing data transmission rates. Advanced path-finding algorithms help to extend the range of voice command detection and enable the system (100) to determine the user's location with greater accuracy.

The working of the meshed network (1000) can be better understood by the following example; (Referring to FIG. 1), If the user device (10a) receives the voice command from the user (1), the user device (10a) verifies the voice command. If the voice command is valid then verifies the user (1). If the user (1) is the authorised user, then the user device (10a) transfers the voice command, the user device ID, and the user ID to the nearby user device (10) that is the user device (10b) or user device (10c) or user device (10d) or user device (10f) or user device (10i) or user device (10j). The meshed algorithm determines the best path to transfer the voice command and the user ID to the base unit (20). The meshed algorithm determines the optimised path that is the user device (10a) to the user device (10b) and then to the base unit (20a). The flow of data transmission is:

the user device (10a)→the user device (10b)→the base unit (20a).

But, if the user device (10b) fails to receive data from the user device (10a) the meshed algorithm reroutes data by transferring data to the user device (10d) and then to the base unit (20d). The rerouted flow of data transmission is:

The user device (10a)→the user device (10d)→the base unit (20d).

A compression algorithm is also used to reduce the size of data being transmitted, which allows for more efficient use of the limited bandwidth available in the wireless meshed network (1000). By compressing the data, the system (100) is able to transmit more data in less time, reducing the risk of network congestion and ensuring a more reliable data transmission. The compression algorithms help to optimize network resources, reducing the overall cost and increasing the system's (100) efficiency.

The meshed algorithm is further enhanced with additional features such as routing and forwarding algorithms for efficient data transmission, and an encryption algorithm for security and an error correction algorithm for reliability. The encryption algorithm is used for security to protect the privacy of the voice command and location data by converting it into an unreadable form. The encryption algorithm is applied to the voice command in the meshed network (1000) to ensure secure communication between interconnected user devices. This can ensure that the data remains confidential and secure, and is not intercepted or tampered with by unauthorized individuals. The error correction algorithm, on the other hand, is used for reliability to ensure that data is transmitted accurately.

The error correction algorithm is used in a wireless meshed network (1000) to detect and correct errors that occur during transmission. The error correction algorithms for reliability to ensure that the data transmitted is accurate and complete, even in the presence of errors or interference in the meshed network (1000). This is important in emergency situations, where accuracy and reliability are critical for ensuring that the emergency responders receive the correct information. In another embodiment of the present invention, other algorithms used for encryption and error correction in the meshed network (1000) are but not limited to Advanced Encryption Standard (AES), Data Encryption Standard (DES), and Rivest-Shamir-Adleman (RSA) encryption. The error correction algorithms are but not limited to Forward Error Correction (FEC) and Cyclic Redundancy Check (CRC) which are used to detect and correct errors in the transmission of data interconnected user devices of the meshed network (1000). These algorithms help to ensure the integrity of the data and enhance the reliability of the meshed network (1000).

The base unit (20) receives the voice command along with the user device ID, and the user ID from the user device (10) which is nearest to the base unit (20) and calculates the ranging data with the user device (10) (identified by its user ID) which received the voice command from the user (1) for determining the user's location by using various ranging techniques. A signal processor (21) is provided in the base unit (20) to calculate the ranging data, and a power supply (23) is provided to power all the components of the base unit (20). Further, each of the base unit (20) includes a corresponding communication unit (22).

The ranging techniques employed to calculate the ranging data are Time of Arrival (TOA), Time of Departure (TOD), Time of Flight (TOF), Angle of Arrival (AOA), Time Difference of Arrival (TDOA), and Received Signal Strength Indicator (RSSI).

The base unit (20) then transmits the voice command along with the user device ID, the user ID and the ranging data to the master controller (30) of the processing unit (50) by using the communication unit (22) of the base unit (20). Specifically, the communication unit (22) comprises a transceiver for transmitting and receiving data between the user device (10a, 10b, 10c, 10d, 10e, 10f, 10g, 10h, 10i, 10j, . . . ) and the master controller (30). The processing unit (50) is connected to the plurality of base units (20a, 20b, 20c, 20d).

The master controller (30) of the processing unit (50) includes a communication component (33) having a communication interface to receive the voice command and the ranging data from the base unit (20). Further, the master controller (30) includes a processing module (31), a location engine (311), and a memory (32) to store data such as the voice command, the user device ID, the user ID, the ranging data, and the user's location.

The processing module (31) of the master controller (30) includes a speech-to-action model (312) which processes the voice command to determine intent and perform the corresponding speech-to-action.

The speech-to-action model (312) uses Natural Language Processing (NLP) techniques to analyse the voice command to extract the intent and converts the voice command into an actionable response such as calling for emergency help based on determined intent, such as summoning emergency help.

When the user (1) gives the voice command, the voice command may be captured by one or more user devices and sent to the base unit (20) and subsequently to the master controller (30). If there are same commands repeated, the speech-to-action model (312) of the master controller (30) verifies whether the same voice command is issued by the same user before processing the voice command to avoid multiple responses. If the speech-to-action model (312) detects that the same command is issued by the same user, the speech-to-action-model (312) processes the voice command only once and ignores subsequent duplicate commands from the same user. For example, if the user (1) issues the voice command that is captured by one or more user devices and these voice commands along with the user device ID, and the user ID are transmitted to the base unit (20) and then the base unit (20) sends the voice commands along with the user device ID, and the user ID and the ranging data to the master controller (30). The master controller (30) uses this information to process only one instance of the voice command and avoids multiple responses. If another user issues the same command, the voice command is treated as a new command and processed separately.

The location engine (311) of the master controller (30) calculates the user's location in three-dimensional coordinates based on the ranging data received from the base unit (20). The user's location is then transmitted to the central server (40) to visualise the user's location on a graphical map. The user's location is crucial in emergency situations where first responders such as emergency services need to quickly locate and assist the user (1).

In another embodiment of the present invention, the master controller (30) has additional features such as data encryption and authentication mechanisms to ensure the security and privacy of user data.

The central server (40) receives the user's location calculated by the master controller (30) and visualizes the user's location, tracks the plurality of user devices (10a, 10b, 10c, 10d, 10e, 10f, 10g, 10h, 10i, 10j), and shows the real-time location of the user device (10). The central server (40) is a device which is capable of running a user application. The user application runs on a central server to visualise the user's location and show the real-time location of the user device (10). An administrator uses the central server (40) to manage and configure the system's (100) components and settings, such as network parameters, security settings, and user permissions. In another embodiment of the present invention, the central server (40) has tools for monitoring the system's (100) performance and generating reports on the usage of the user device (10).

In another aspect of the present invention the user device (10) is a standalone secure user voice interface for both cloud-based and non-cloud-based external voice assistants. The user device (10) establishes a connection with the external voice assistant (3) over the meshed network (1000) through another user device acting as an interface node. The interface node connects to the external voice assistant (3) using a suitable network connection such as Wi-Fi or Bluetooth pairing.

The user device (10) receives the voice command from the user (1) and verifies the voice command. If the voice command is valid then the user device (10) verifies the user (1). Then the user device (10) transmits the voice command to the external voice assistant (3) through the interface node. the external voice assistant (3) then processes the voice command and sends back the voice response as feedback, which will be played through the speaker (107) of the user device (10). The user device (1) has onboard processing and storage capabilities, along with the necessary software and drivers, to handle the interactions with the voice assistant securely.

In one more embodiment of the present invention, the user device (10) includes an on-device audio recording feature that records the voice command of the user (1) and audio during emergency situations. The recorded audio is used to understand the context of the situation and provide appropriate assistance to the user (1). Additionally, the user device (10) includes a call recording feature that records incoming and outgoing calls, which can be useful for security purposes.

In some of the embodiments, the user device (10) is a wearable user device in various applications, including but not limited to the hotel industry, for staff to have quick access to emergencies, such as a medical emergency, a safety concern, or a security threat. The wearable user device is connected to the hotel's emergency response system and help staff quickly summon assistance in emergency situations. The wearable user device allows the staff to communicate with a central authority or emergency service in real-time, providing the required assistance in case of any emergency situations. Also, it allows the staff to communicate with other staff members, security personnel, or emergency services with ease and quickly. The wearable user device also includes accelerometers, gyroscopes, and magnetometers, to detect falls or other accidents and automatically trigger an emergency response. The 3-axis accelerometer and 3-axis gyro determine the wearable user device's motion status and angular movements, helping to identify whether the wearable user device is in motion or not, based on acceleration forces and angular movement.

In some embodiments, the wearable user device includes a GPS module to enable location tracking in outdoor applications. The wearable user device uses satellite signals to determine its location, which is useful for navigation, emergency response, and tracking purposes. The integration of GPS technology allows for real-time location tracking of the wearable user device, providing valuable information for emergency response, navigation, and other outdoor applications.

In some embodiments, the wearable user device is also equipped with a satellite communication module and has the ability to make Emergency calls, and 2-way voice calls to $3^{rd}$ party phone numbers and messaging in emergency situations. By connecting to satellites, the wearable user device allows the user to call for help in the event of an emergency, ensuring that the user can stay safe and get the assistance they need, even in the most remote of locations.

The wearable user device has a two-way voice and video calling functionality that allows the user to initiate outgoing voice and video calls and receive incoming calls. Outgoing calls are initiated by the user through a voice command, while incoming calls can be received by the wearable user device, allowing for real-time communication between the user and a remote party. The wearable user device also has features such as call holding, call hanging, call switching, call forwarding, and call conferencing to provide a complete two-way communication experience. Additionally, the wearable user device includes security measures in place to ensure the privacy of the communication, such as signal encryption.

In one more embodiment of the present invention, the wearable user device is braille-enabled to allow the user to activate a panic SOS alert in case of emergency. This feature provides an additional layer of safety for users who may not be able to communicate verbally or visually.

The system (100) for the transmission of voice commands can be explained by considering the example of a school. The system (100) is used to provide a secure and efficient way for students and staff to quickly summon help in emergency situations. The meshed network (1000) of interconnected user devices and the plurality of base units (20a, 20b, 20c, 20d) are deployed throughout the school premises to form the meshed network (1000). The meshed network (1000) covers the entire school area, including classrooms, hallways, offices, and playgrounds, providing seamless coverage and reliable voice command and location tracking. The system (100) utilizes Automatic Speech Recognition (ASR) algorithms to ensure that the voice command is valid and the user is a registered user (1). Before a student or staff member uses the system (100) to summon emergency help, they need to register with the system (100) by providing the user ID and saying specific phrases or words to the user device (10).

In case of an emergency, the registered student or staff member issues a voice command, such as "Help me!", and the user device (10) receives the voice command and improves its quality. The user device (10) verifies the voice command using Automatic Speech Recognition (ASR) to check whether the voice command is valid or not. If the voice command is valid, then the user device (10) verifies the user (1) by using voice biometrics algorithms to check whether the user (1) is registered/authorized or not. If the user (1) is the authorised user, the voice command along with the user device ID, the user ID is transmitted through interconnected devices of the meshed network (1000) to the base unit (20), which calculates the ranging data for determining the user's location by using various ranging techniques with the first user device that received the voice command in the meshed network (1000). The master controller (30) receives the voice command along with the user device ID, the user ID and the ranging data. The speech-to-action model (312) in the master controller (30) processes the voice command to determine its intent, and perform the corresponding action based on the determined intent, such as summoning emergency help and communicating user information, incident description, and user location details to appropriate party or system based on the specific context and purpose of the application. Also, the master controller (30) provides feedback to the user (1) regarding the status of the action taken.

The location engine (311) in the master controller (30) calculates the user's location and sends this information to the central server (40). The central server (40) provides visual information about the user's location data, allowing for quick and effective response.

The system (100) is particularly implemented in larger areas or premises or multi-storied homes or buildings enabling users to summon emergency help with voice recognition commands from a larger distance or area without need to speak loudly. Further, the system (100) is capable of locating the user's location and process the voice command to determine the intent of the user (1) and perform the corresponding action based on the determined intent to provide a quick assistance to the user (1) in an emergency based on the user's location wherein the user's location is crucial in emergency situations, enabling first responders, such as emergency services to rapidly locate and assist the user (1).

The system (100) is integrated with the school's communication systems and security systems to ensure timely response and effective communication. The user device (10) is also equipped with additional features such as sensors for detecting smoke, gas leaks, or other hazardous conditions, to provide an added layer of safety for the school's staff and students.

Further, a method (200) for the transmission of voice commands is explained in conjunction with the system (100) for the brevity of the invention.

The method (200) starts at step (210).

At step (220), the microphone array (101) of the user device (10) receives the voice command from the user (1) and sends it to the audio front-end (AFE).

At step (230), the audio front-end (AFE) module (102) of the user device (10) filters and amplifies the voice command to enhance accuracy and remove background noises from the voice command and send it to the application processor (103).

At step (240), the voice processing engine of the application processor (103) verifies the voice command by using the Automatic Speech Recognition (ASR) to check whether the voice command is valid or not.

At step (250), the voice processing engine of the application processor (103) verifies the user (1) by using voice biometric algorithm to check whether the user (1) is registered in the system (100) or not.

At step (260), upon verifying the user (1), if the user (1) is an authorised user, the voice command, the user device ID, and a user ID are transmitted to interconnected devices of the meshed network (1000). The voice command, the user device ID, and the user ID are transmitted between interconnected devices of the meshed network (1000) to reach the base unit (20).

At step (270), the base unit (20) receives the voice command, the user device ID, and the user ID from the user device (10) which is nearest to the base unit (20).

At step (280), the base unit (20) calculates the ranging data with the user device (10) that received the voice command from the user (1) for determining the user's location through the meshed network (1000) using various ranging techniques After that at step (290), the base unit (20) transmits the voice command, the user device ID, the user ID, and the ranging data to the master controller (30) of the processing unit (50).

At step (300), the location engine (311) of the master controller (30) calculates the user's location based on the ranging data received from the base unit (20).

At step (310), the processing module (31) of the master controller (30) is having the speech-to-action model (312) to determine the intent of the user (1) and perform the corresponding action based on the determined intent. The processing module (31) analyzes the user information, incident description, and user location details to derive a specific context and purpose of the application, and communicating the analyzed specific context and purpose to the appropriate party or system based on the specific context and purpose of the application. Also, provide feedback to the user regarding the status of the action taken.

At step (320), the central server (40) of the processing unit (50) is connected to the master controller (30) and receives the user's location from the master controller (30) to visualise the user's location on the graphical map. Specifically, the user's location data is transmitted from the master controller (30) to the central server (40), wherein the central server (40) processes and presents the user's location through a graphical map.

The method ends at step (330).

Therefore, the present invention has the advantage of providing a system (100) for the transmission of voice commands which extends the range of voice detection. The meshed network (1000) of interconnected devices allows a seamless and reliable transmission of the voice command from the user device (10) to the base unit (20). The system (100) is capable to calculate the user's location to quickly assist the user (1) in emergency need.

The foregoing descriptions of specific embodiments of the present invention have been presented for purposes of illustration and description. They are not intended to be exhaustive or to limit the present invention to the precise forms disclosed, and obviously, many modifications and variations are possible in light of the above teaching. The embodiments were chosen and described in order to explain the principles of the present invention best and its practical application, to thereby enable others skilled in the art to best utilise the present invention and various embodiments with various modifications as are suited to the particular use contemplated. It is understood that various omission and substitutions of equivalents are contemplated as circumstance may suggest or render expedient, but such are intended to cover the application or implementation without departing from the scope of the claims of the present invention.

The invention claimed is:

1. A system (100) for extending voice commands and determining a user's location, the system (100) comprises:
    a plurality of user devices (10a, 10b, 10c, 10d, 10e, 10f, 10g, 10h, 10i, 10j, . . . ) connected with each other forming a meshed network (1000) of interconnected user devices for seamless and reliable transmission of a voice command and for extending a range of voice command detection, wherein, each of the user devices (10a, 10b, 10c, 10d, 10e, 10f, 10g, 10h, 10i, 10j, . . . ) is adapted to receive the voice command from a user (1);
    a plurality of base units (20a, 20b, 20c, 20d, . . . ) connected to the meshed network (1000), each of the base units (20a, 20b, 20c, 20d, . . . ) is adapted to receive the voice command from a user device (10a, 10b, 10c, 10d, 10e, 10f, 10g, 10h, 10i, 10j, . . . ) which is nearest to a corresponding base unit (20a, 20b, 20c, 20d, . . . ) and the corresponding base unit (20a, 20b, 20c, 20d, . . . ) calculates ranging data for determining the user's location; and
    a processing unit (50) connected to the plurality of base units (20a, 20b, 20c, 20d, . . . ) to determine the user's location using the ranging data, process the voice command to determine an intent of the user (1) and perform a corresponding action based on a determined intent and facilitate to visualise the real-time location of the user devices (10a, 10b, 10c, 10d, 10e, 10f, 10g, 10h, 10i, 10j, . . . ).

2. The system (100) as claimed in claim 1, wherein the processing unit (50) is having;
    a master controller (30) to receive the ranging data, the user device ID, the user ID and the voice command from the base unit (20a, 20b, 20c, 20d, . . . ), and calculate the user's location based on the ranging data, and process the voice command to determine an intent of the user (1) and perform a corresponding action based on the determined intent; and
    a central server (40) connected to the master controller (30)), the central server (40) visualizes the user's location, tracks the plurality of user devices (10a, 10b, 10c, 10d, 10e, 10f, 10g, 10h, 10i, 10j, . . . ), and shows the real-time location of the user device (10a, 10b, 10c, 10d, 10e, 10f, 10g, 10h, 10i, 10j, . . . ).

3. The system (100) as claimed in claim 2, wherein the master controller (30) includes;
    a processing module (31) to process the voice command, the processing module (31) is having a location engine (311) to calculate the user's location, and a speech-to-action model (312) to process the voice command to determine an intent of the user (1) and perform a corresponding action based on a determined intent;
    a memory unit (32) for storing data; and
    a communication component (33) comprising a communication interface equipped with dedicated network interface circuitry, including Ethernet ports, wireless communication chips (Wi-Fi, Bluetooth), and physical layer (PHY) transceivers that facilitate the sending and receiving of data between the base unit (20a, 20b, 20c, 20d, . . . ) and the central server (40).

4. The system (100) as claimed in claim 3, wherein the speech-to-action model (312) processes the voice command only once, and ignores subsequent duplicate commands from the same user to avoid multiple responses.

5. The system (100) as claimed in claim 1, wherein the user (1) requires user registration into the system by providing the user ID and speaking specific phrases or words into the user device (10a, 10b, 10c, 10d, 10e, 10f, 10g, 10h, 10i, 10j, . . . ) to prevent unauthorised usage of the system (100).

6. The system (100) as claimed in claim 1, wherein each of the user devices (10a, 10b, 10c, 10d, 10e, 10f, 10g, 10h, 10i, 10j, . . . ) includes:
    a microphone array (101) to capture the voice command from the user (1);

an audio front-end (AFE) module (102) integrated with digital signal processing hardware capable of filtering and amplifying the voice command to enhance accuracy and remove background noises from the voice command;

an application processor (103) comprising a voice processing engine with embedded software capable of verifying the voice command and the user (1);

a communication module (104) comprising a communication protocol stack which includes physical and data link layer circuitry to transmit and receive data between interconnected user devices of the meshed network (1000), and between the user device (10a, 10b, 10c, 10d, 10e, 10f, 10g, 10h, 10i, 10j, . . . ) and the base unit (20a, 20b, 20c, 20d, . . . );

a vibration motor (105) to provide feedback to the user (1);

a display unit (106) to confirm a receipt of the voice command and provide visual feedback;

a speaker (107) to provide audio feedback;

a panic button (108) to make an emergency call in case of an urgent situation;

a camera (109) to capture the user's movement;

a Lidar/Radar sensor (110) to detect human presence; and a power unit (111) to supply power to all components of the user device (10a, 10b, 10c, 10d, 10e, 10f, 10g, 10h, 10i, 10j, . . . ).

7. The system (100) as claimed in claim 6, wherein the audio front end (AFE) module (102) of the user device (10a, 10b, 10c, 10d, 10e, 10f, 10g, 10h, 10i, 10j, . . . ) improves the quality of audio signals using Digital Signal Processing (DSP) algorithms including:

a far field voice capture amplification technique captures the voice commands from the user (1) who is several meters away from the user device (10a, 10b, 10c, 10d, 10e, 10f, 10g, 10h, 10i, 10j, . . . );

an Acoustic Echo Cancellation (AEC) (1021) algorithm is used to remove acoustic echoes from the user's voice command;

a Barge-in algorithm allows the system (100) to listen and respond to the voice command even when the user device is playing back the audio and De-reverberation algorithms reduces the impact of room echoes;

an adaptive beamforming (1022) technique tracks the user's speech from a desired direction while suppressing audio interference from other directions;

a playback enhancement technique improves the quality of audio played through the speaker (107); and an automatic Gain Control (AGC) (1026) algorithm adjusts the gain of input audio signal to maintain a consistent audio level.

8. The system (100) as claimed in claim 1, wherein each of the base units (20a, 20b, 20c, 20d, . . . ) includes;

a signal processor (21) to calculate ranging data;

a communication unit (22) comprising a transceiver for transmitting and receiving data between the user device (10a, 10b, 10c, 10d, 10e, 10f, 10g, 10h, 10i, 10j, . . . ) and the master controller (30); and a power supply (23) to supply power to all components of the base unit (20a, 20b, 20c, 20d, . . . ).

9. The system (100) as claimed in claim 1, wherein each of the user devices (10a, 10b, 10c, 10d, 10e, 10f, 10g, 10h, 10i, 10j, . . . ) is adapted to functions as a voice assistant that uses a microphone array (101) to receive voice commands from the user (1), processes the voice command and responds with voice feedback through a speaker (107).

10. The system (100) as claimed in claim 1, each of the user devices (10a, 10b, 10c, 10d, 10e, 10f, 10g, 10h, 10i, 10j, . . . ) is adapted to function as a standalone secure user voice interface for both cloud-based and non-cloud-based external voice assistants (3) over the meshed network (1000).

11. The system (100) as claimed in claim 1, wherein each of the user devices (10a, 10b, 10c, 10d, 10e, 10f, 10g, 10h, 10i, 10j, . . . ) is a wearable device having a GPS module to track the user's location.

12. The system (100) as claimed in claim 1, wherein each of the user devices (10a, 10b, 10c, 10d, 10e, 10f, 10g, 10h, 10i, 10j, . . . ) acts as a network interface node when connected wired or wirelessly to an external device (2) which is but not limited to a mobile phone or a tablet or a computer for configuring, provisioning, and commissioning of other existing user devices over the meshed network (1000).

13. The system (100) as claimed in claim 12, wherein a new user device is wired or wirelessly connected to the external device (2) to configure the new user device and add the new user device to the meshed network (1000).

14. The system (100) as claimed in claim 1, wherein the system (100) is particularly implemented in larger areas or premises or multi-storied homes or buildings enabling users to summon emergency help with voice recognition commands from a larger distance or area without need to speak loudly.

15. The system (100) as claimed in claim 1, wherein the system (100) is capable of locating the user's location and process the voice command to determine the intent of the user (1) and performing the corresponding action based on the determined intent to provide a quick assistance to the user (1) in an emergency based on the user's location wherein the user's location is crucial in emergency situations, enabling first responders, such as emergency services to rapidly locate and assist the user (1).

16. The system (100) as claimed in claim 1, wherein the meshed network (1000) utilizes various communication technologies for enabling efficient and reliable communication among the user devices (10a, 10b, 10c, 10d, 10e, 10f, 10g, 10h, 10i, 10j, . . . ) and employs advanced algorithms, including:

routing and forwarding algorithms for efficient data transmission;

encryption algorithm for security which protects the privacy of the data by converting it into an unreadable form that cannot be intercepted or tampered with by unauthorized individuals;

error correction algorithms for reliability, which ensures that data is transmitted accurately by detecting and correcting errors that occur during transmission;

path finding algorithms for selecting an optimum route for data transmission; and compression algorithms for reducing the data size of voice commands and optimizing network resources.

17. A method (200) for extending voice commands to determine a user's location, the method comprises the steps of:

receiving the voice command from the user (1) through a user device (10a, 10b, 10c, 10d, 10e, 10f, 10g, 10h, 10i, 10j, . . . );

filtering and amplifying a voice command to enhance accuracy and remove background noises from the voice command by an audio front-end (AFE) module (102) comprising a digital signal processing algorithm;

verifying the voice command using Automatic Speech Recognition (ASR) of a voice processing engine to check whether the voice command is valid or not;

verifying the user (1) by using voice biometrics algorithms of a voice processing engine to check whether the user (1) is registered into a system (100) or not;

transmitting the voice command, a user device ID and a user ID to interconnected devices of a meshed network (1000);

receiving the voice command, the user device ID and the user ID from the user device (10a, 10b, 10c, 10d, 10e, 10f, 10g, 10h, 10i, 10j, . . . ) which is nearest to a corresponding base unit (20a, 20b, 20c, 20d, . . . );

calculating a ranging data with the user device (10a, 10b, 10c, 10d, 10e, 10f, 10g, 10h, 10i, 10j, . . . ) which received the voice command from the user (1) for determining the user's location through the meshed network (1000);

transmitting the voice command, the user device ID, the user ID, and the ranging data to a processing unit (50) from the plurality of base units (20a, 20b, 20c, 20d, . . . );

calculating a user's location based on the ranging data received from the plurality of base units (20a, 20b, 20c, 20d, . . . );

processing the voice command to determine the intent of the user (1) by using a speech-to-action model (312) and performing a corresponding action based on the determined intent;

analyzing the user ID, incident description, and user location details to derive a specific context and purpose of the application, and communicating the analyzed specific context and purpose to the system (100), wherein the corresponding action is based on the derived specific context and purpose; and transmitting the user's location data from the master controller (30) to a central server (40), wherein the central server (40) processes and presents the user's location through a graphical map.

* * * * *